United States Patent [19]

Bowen et al.

[11] 4,450,334

[45] May 22, 1984

[54] MICROWAVE PIZZA MAKER

[75] Inventors: Robert F. Bowen, Burlington; Thomas J. Martel, North Reading, both of Mass.

[73] Assignee: Raytheon Company, Lexington, Mass.

[21] Appl. No.: 256,889

[22] Filed: Apr. 24, 1981

[51] Int. Cl.³ .............................................. H05B 6/80
[52] U.S. Cl. ................................. 219/10.55 E; 99/451; 426/243
[58] Field of Search .................. 219/10.55 E, 10.55 F; 426/243, 241, 107; 99/DIG. 14, 451

[56] References Cited

U.S. PATENT DOCUMENTS

| | | | |
|---|---|---|---|
| 3,941,967 | 3/1976 | Sumi et al. | |
| 4,065,583 | 12/1977 | Ahlgren | 426/243 |
| 4,306,133 | 12/1981 | Levinson | 219/10.55 F |
| 4,317,017 | 2/1982 | Bowen | 219/10.55 E |
| 4,362,917 | 12/1982 | Freedman et al. | 219/10.55 F |

Primary Examiner—Bruce A. Reynolds
Assistant Examiner—M. M. Lateef
Attorney, Agent, or Firm—William R. Clark; Joseph D. Pannone

[57] ABSTRACT

A microwave pizza maker including a metallic pan, a metallic cover, and a microwave transparent base for removably supporting the pan and cover in spaced overlap alignment forming a partial microwave choke between the side of the pan and a peripheral region of the cover. A layer containing ferrite particles is attached to the undersurface of the pan to absorb microwave energy and produce heat for conduction to the interior defined by the pan and the cover. The base has legs so that the pan is elevated at least an inch above the floor of the oven. The support surface for the pan consists of a plurality of protrusions or spacers to provide a small surface contact area to minimize heat transfer from the pan to the base. The spacers may be fabricated from a different material than the remainder of the base and connected thereto.

6 Claims, 9 Drawing Figures

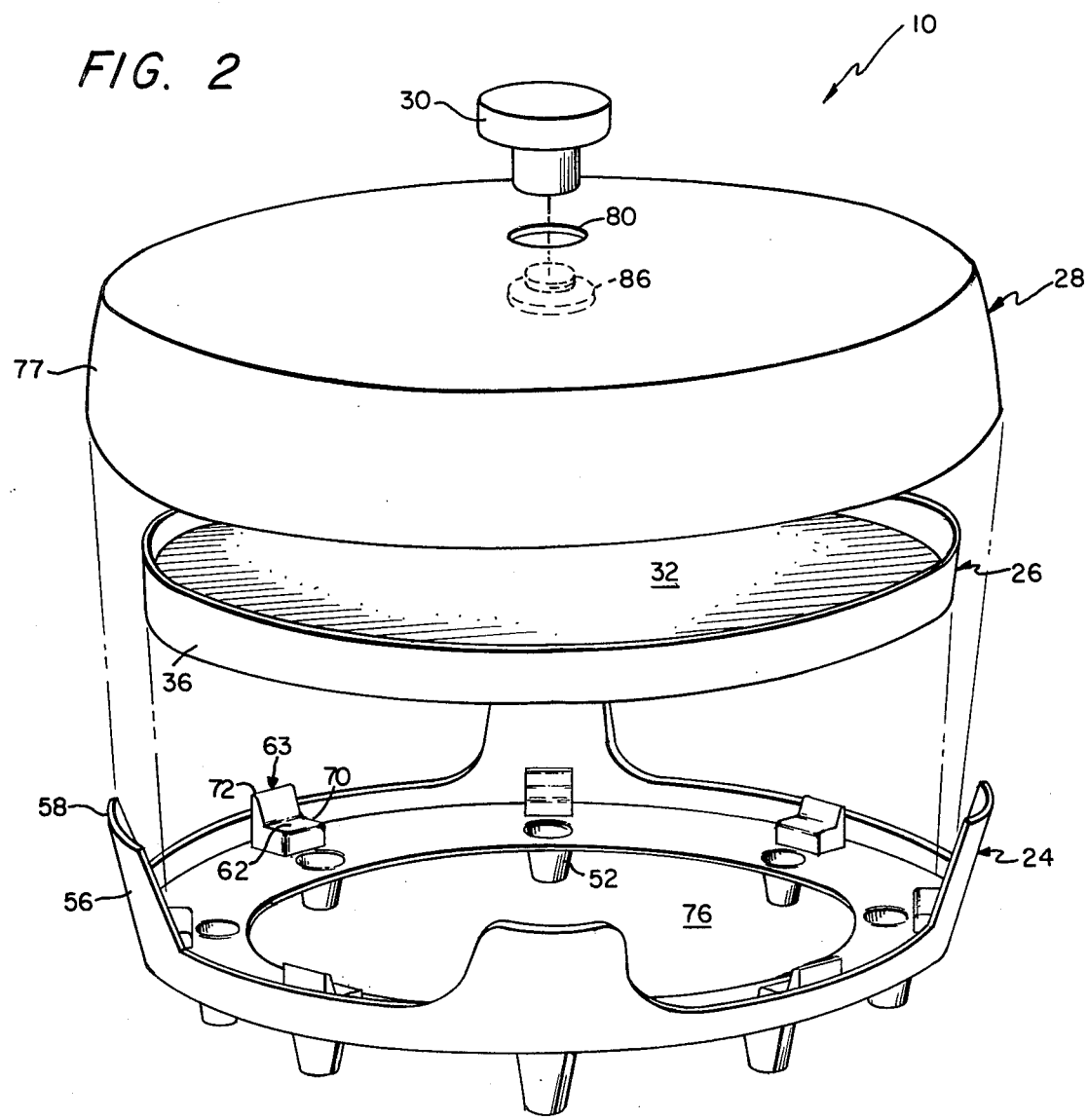

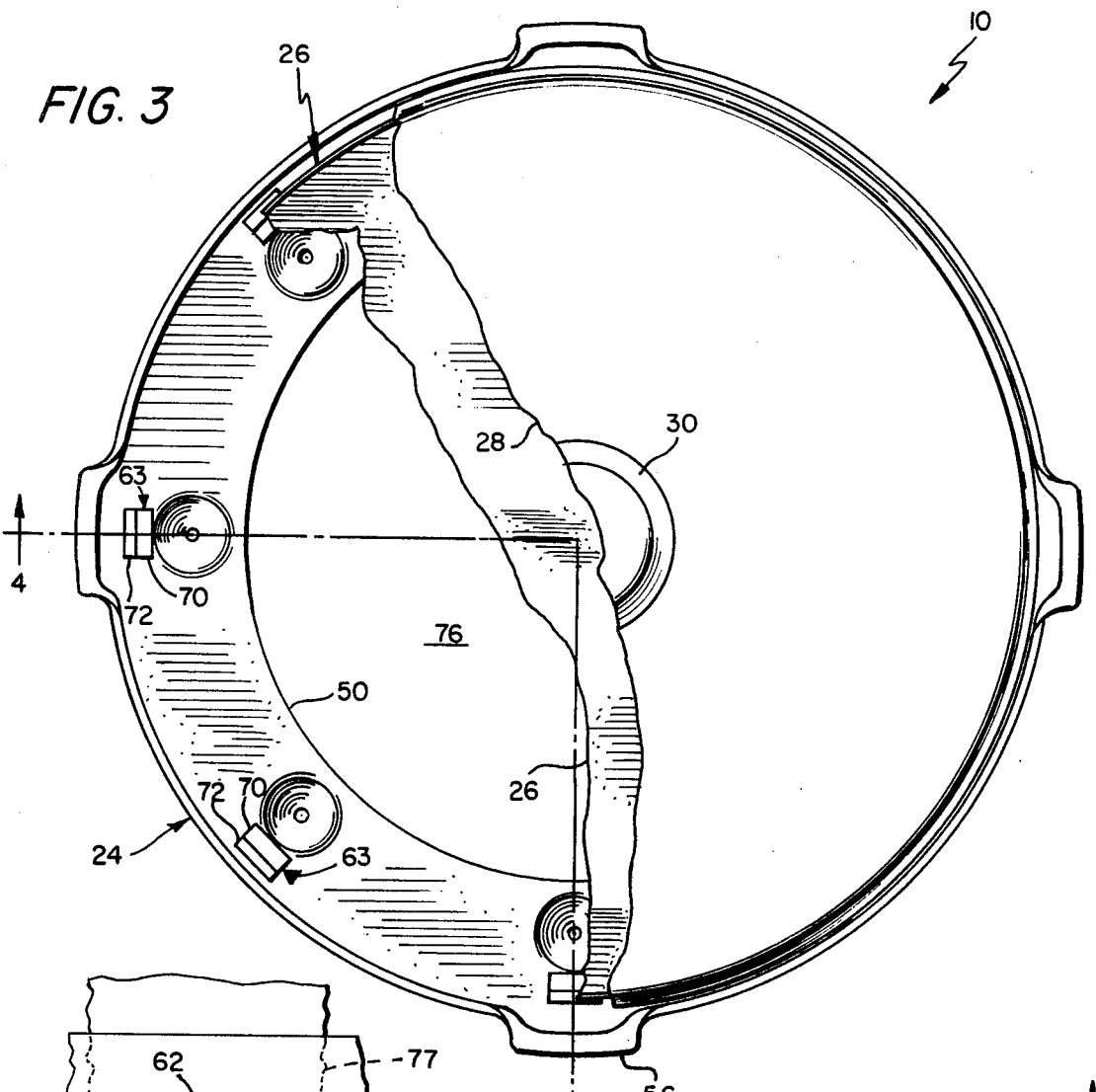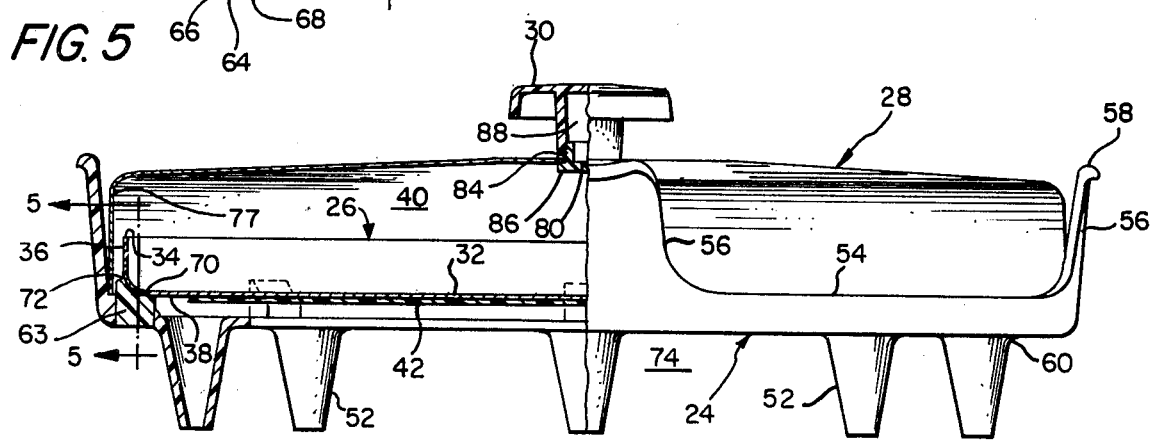

MICROWAVE PIZZA MAKER

BACKGROUND OF THE INVENTION

As is well known, the basic principle of heating in a microwave oven is much different than with a conventional gas or electric oven. More specifically, with a conventional gas or electric oven, the oven chamber is heated and the food positioned therein is heated and cooked by the inward conduction of that heat. With a microwave oven, however, the heat is produced in the food by molecular agitation caused by the microwave field. The air around the food remains substantially unheated and the surface of the food is not appreciably hotter than the interior.

Pizzas prepared in microwave ovens heretofore have generally been unsatisfactory. This statement is true whether the pizza is a pre-packaged frozen pizza or prepared from scratch in the home. Typically, the undesirable characteristics are non-uniform heating and soggy or moist crusts. The problem results from the make-up of pizzas. Basically, they consist of a bread-dough base covered with cheese and tomato paste topped with meats, fish, or vegetables. When the constituents other than the dough are finished cooking in the microwave oven, the dough is not sufficiently dry to provide a crisp crust. There is a need for a utensil that provides conduction heat to the crust for browning while simultaneously shielding the other constituents from microwave energy to prevent overcooking.

SUMMARY OF THE INVENTION

The invention discloses the combination of a microwave transparent base having an upwardly extending protrusion, a microwave conductive pan having a bottom with a raised side, the pan being removably supported by the protrusion, a layer of microwave absorbing material attached to a portion of the underside of the bottom for producing heat in the presence of microwave energy, and a microwave conductive cover removably supported by the base, the cover having a peripheral region overlapping the raised side for forming a partial microwave choke to limit the amount of microwave energy in the interior defined by the pan in the cover. By microwave transparent, it is meant that microwave energy will pass through the material without substantial loss. It may be preferable that the bottom be substantially planar. Also, the absorbing material may comprise ferrite particulate or particles which are dispersed or positioned in high temperature plastic, such as, for example, silicone. Also, it is preferable that the contact area between the pan and base is substantially less than the area of the undersurface of the pan. Preferably, the pan and cover may comprise aluminum. Also, it may be preferable that the region and side overlap for a distance greater than 0.5 inches in a direction perpendicular to the edge of the side.

The invention may be practiced by a utensil for heating pizza in a microwave oven comprising a microwave transparent base having at least three protrusions extending upwardly, a metallic pan having a substantially planar bottom with a raised side, the pan being removably supported by the protrusions, the protrusions comprising means for substantially preventing movement of the pan in a horizontal direction with respect to the base, a layer comprising ferrite particles attached to a portion of the undersurface of the bottom, the layer producing heat in the presence of microwave energy, and a metallic cover removably supported by the base, the cover having a peripheral region overlapping the raised side for a distance greater than 0.25 inches in a direction perpendicular to the edge of the side, the region being spaced and substantially parallel to the side for forming a partial microwave choke to limit the amount of microwave energy in the interior defined by the pan and the cover. Preferably, the base may comprise polysulfone. Also, the preventing means may comprise raised members from the protrusions.

The invention also discloses a utensil for heating pizza in a microwave oven, comprising a microwave transparent base having at least three upwardly extending protrusions at spaced positions adjacent to the outer perimeter thereof, the top of each protrusion having a substantially horizontal inward surface and a raised outer member, a metallic pan having a substantially flat bottom with a raised side, the pan being removably supported in fixed horizontal alignment by the horizontal inward surfaces of the protrusions, a layer comprising ferrite particles attached to the underside of the bottom for producing heat in the presence of microwave energy, a base having a plurality of legs, the downward end of the legs being spaced more than an inch from the removably supported pan, and a metallic cover removably supported by the base, the cover having a peripheral region overlapping the raised side for a distance of greater than 0.25 inches in a direction perpendicular to the edge of the side, the region being spaced and substantially parallel to the side for forming a partial microwave choke to limit the amount of microwave energy in the interior defined by the pan and the cover. It may be preferable that the base have a central vertical aperture. Preferably, the aperture may be larger than the surface area of the layer.

The invention discloses a utensil adapted for heating pizza in a microwave oven, comprising a microwave transparent base having eight protrusions extending upwardly at spaced positions defining a perimeter adjacent to the periphery of the base, the top of each of the protrusions having a substantially horizontal platform on the inward side and a raised member on the outward side, the base comprising handles extending upwardly from the periphery of the base to a height above the protrusions, a metallic pan having a substantially flat bottom defining a surface having a shape substantially equal to the perimeter, the pan being removably supported by the horizontal platforms of the protrusions, the raised members restricting horizontal movement of the pan with respect to the base, the pan having a raised side, a layer comprising ferrite particles positioned in high temperature silicone attached to the underside of the bottom, the base having a plurality of at least three legs with bottom ends being greater than one inch from the removably supported pan, the base having a vertical aperture in the center, and a metallic cover removably supported by the base, the cover having a peripheral region overlapping the side for a distance greater than 0.25 inches in a direction perpendicular to the edge of the side, the region being spaced and substantially parallel to the side for forming a partial microwave choke to limit the amount of microwave energy in the interior defined by the pan and the cover. It may be preferable that the protrusions comprise high temperature silicone while the remainder of the base comprises a material other than silicone.

The invention may also be practiced by the method of heating a pizza in a microwave oven comprising the steps of providing conduction heat to the bottom of the pizza while exposing the top of the pizza to microwave energy for a first time period, and providing conduction heat to the bottom of the pizza while substantially shielding the pizza from microwave energy for a second time period.

BRIEF DESCRIPTION OF THE DRAWINGS

The objects and advantages of the invention will be more fully understood by a reading of the Description of the Preferred Embodiment with reference to the drawings wherein like designations of the several drawings designate like parts, wherein:

FIG. 2 is an expanded view of the pizza maker showing the piece parts separated;

FIG. 3 is a top view partially cut away of the pizza maker;

FIG. 4 is a side view taken along line 4—4 of FIG. 3;

FIG. 5 is a front view of a spacer taken along 5—5 of FIG. 4;

DESCRIPTION OF THE PREFERRED EMBODIMENT

Figure 1:
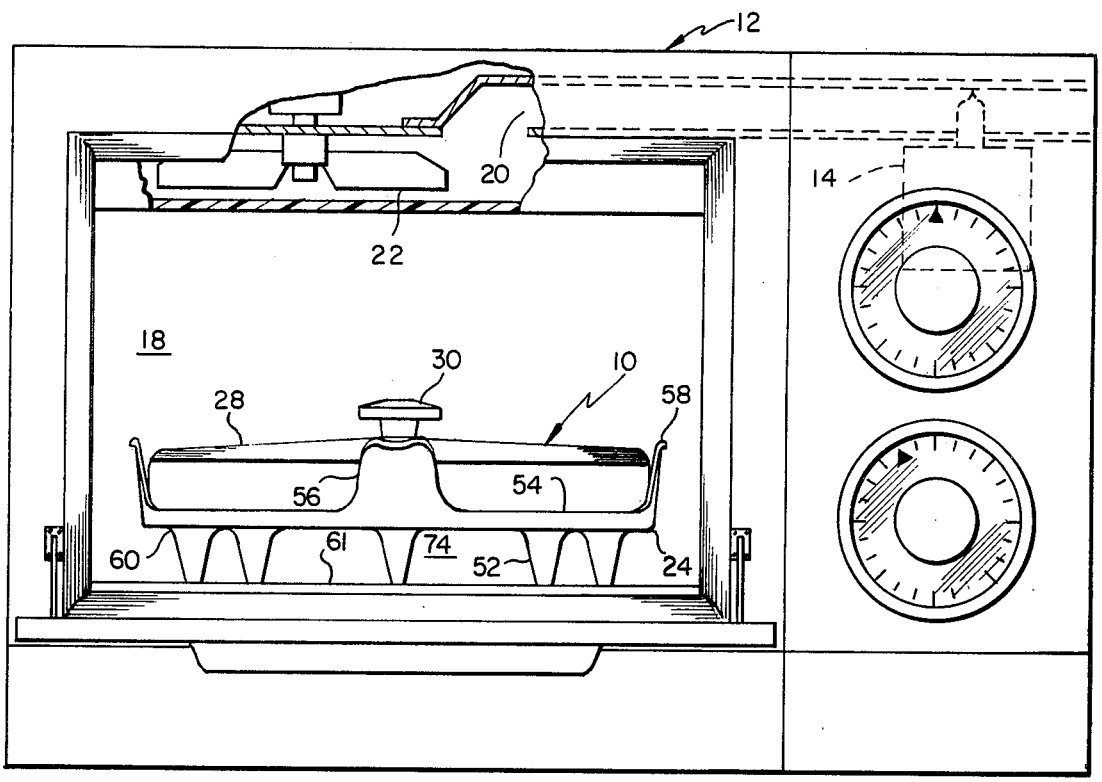
FIG. 1 shows the pizza maker embodying the invention positioned in a conventional microwave oven.

Referring to FIG. 1, there is shown a microwave pizza maker 10 or utensil embodying the invention. The pizza maker 10 is positioned in a conventional microwave oven 12. Typically, microwave energy having a frequency of 2450 megahertz is provided by magnetron 14. The microwave energy is coupled to cavity 18 by any suitable means such as, for example, through a waveguide 20 and past a mode stirrer 22. More preferably, a primary radiator (not shown) having a directive pattern may be used to couple the energy into the cavity. Other conventional microwave oven parts and features such as, for example, the door seal, are not described in detail as they are well known in the art.

Referring to FIG. 2, an expanded view of pizza maker 10 is shown with the composite parts separated for illustration. More specifically, pizza maker 10 consists of a base 24, a pan 26, and a cover 28 having a handle 30.

Referring to FIGS. 3 and 4, partial views of pan 26 are shown from the top and front; FIG. 4 is taken along 4—4 of FIG. 3. Pan 26 is made of a material that is reflective or conductive to microwave energy. Preferably, the material may be aluminum because of its light weight properties although steel could also be used to advantage. The bottom 32 of pan 26 is substantially flat and circular; other shapes such as square could also be used. The diameter of bottom 32 is 12.25 inches. An important consideration in selecting this dimension was the size of commercially available frozen pizzas. Although there are a substantial number of smaller pizzas, 12 inches is a popular size. Actual measurement of these commercially available frozen pizza revealed that the large size was typically in the range from 11 to 12.25 inches. Accordingly, by selecting a dimension of 12.25 inches, a substantial percentage of the commercially available frozen pizzas including those of a much smaller size could be cooked with pizza maker 10. Needless to say, homemade pizzas could be sized to fit the pizza maker having a diameter of 12.25 inches. The edge 34 of pan 26 is formed upwards to provide a side 36 which in combination with cover 28 forms a partial choke to be described in detail later herein. Preferably, side 36 extends upward for ⅜ inch or more.

Attached to the undersurface 38 of the bottom 32 of pan 26 is a material that heats in the presence of microwave energy. The heat generated therefrom conducts through the bottom 32 of the pan heating the interior 40 of the pizza maker. Preferably, the material may be a flexible plastic layer 42 having ferrite particles dispersed therein. More specifically, the plastic layer may comprise high temperature silicone having a thickness of approximately 0.05 inches and a diameter of 10 inches for the example pan sizses of 12.5 inches. Also, the ferrite particles may be ferrite Q1 supplied by Indiana General; 115 grams of the ferrite may preferably be contained in layer 42. The layer may be bonded to undersurface 38 using well-known methods.

Preferably, the ferrite particles are chosen so that the center of their Curie point region is between 500° F. and 550° F. so that microwave energy absorption by the particles will be substantially reduced before the layer 42 reaches a temperature of 600° F. The term "Curie point region" is intended to mean the temperature range in which a ferrite particle has its value of magnetic permeability reduced from 90 percent of its room temperature value to 50 percent of its room temperature value as the ferrite particle is heated from room temperature through said temperature range. In other words, when layer 42 is positioned in a microwave field, the layer heats to approximately 500° F. or 550° F. and thermostats at that temperature.

Referring to FIGS. 3 and 4, partial top and side views of base 24 are shown; FIG. 4 is taken along line 4—4 of FIG. 3. Base 24 is fabricated of a microwave transparent material and functions to support pan 26 in an elevated position above the floor 61 of the microwave cavity 18. Furthermore, base 24 functions to align cover 28 with pan 26. Base 24 has a flat donut shaped member 50 or apertured disk which is supported by eight hollow inwardly tapered legs 52. The outer edge of member 50 is raised upwardly to form rim 54 which prevents horizontal movement of cover 28 when positioned on the base 24. In other words, rim 54 functions to align cover 28 with the base 24 thereby also aligning it with the pan 26. Four handles 56 extend upwardly from circular rim 54 in diametrical pairs. In lifting pizza maker 10, thumbs may be positioned on the top 58 of the respective opposing handles 56 with the fingers extending under member 50. It is preferable that handles 56 extend upwardly instead of outwardly so that the size of the microwave cavity that pizza maker 10 will fit into will not be limited more than necessary. In summary, it was desirable to make pan 26 with a diameter of 12.25 inches to accomodate most commercially available frozen pizzas. Further, it is preferable that pizza maker 10 fit into the cavities of most commercially available microwaven ovens. As 13.6 inches may be a typical size for a microwave cavity, there is not enough differential to extend handles 56 outwardly. In other words, by minimizing the outward extension of handles 56, pizza maker may be optimized for utilization with pizza and oven sizes.

Still referring to FIG. 4, legs 52 protrude downwardly from a point 60 inside the outer perimeter of member 50. Accordingly, base 24 is adapted for being supported in a microwave oven having a rotating bottom or carousel which is of smaller diameter than the width of the microwave cavity.

As stated earlier herein, base 24 functions to elevate pan 26 from the floor 61 of cavity 18. For reasons well known in the art, if layer 42 had the respective conductive surfaces of pan 26 and floor 61 on opposite sides, very little microwave energy would couple to the layer. Also, if the support surface of the microwave oven is a microwave transparent plate elevated above the conductive cavity floor, it is desirable that the plate not be subjected to the high temperature of layer 42.

It is preferable that substantial heat is not transferred from pan 26 to base 24. Towards this objective, the contact area 62 between the two is small and the legs 52 are made relatively long. More specifically, support pedestals 63 or protrusions rise at a plurality such as eight evenly spaced locations adjacent to the outer perimeter of member 50. Spacers 63, a front view of which is shown in FIG. 5 taken along line 5—5 of FIG. 4, may snap into slots 64 in member 50. Except for the snap-in spacers 63, the base 24 is single piece molded and consists of a microwave transparent material such as, for example, ceramic, glass, or plastic. Spacers 63 have indentations 66 with a bottom outwardly extending lip 68 which secures them in slots 64. In a position inserted in a slot 64 as shown in the figures, a spacer 63 has an inward platform 70 for supporting pan 26. The total contact area between the pan 26 and base 24 is not greater than the sum of the platform areas. As each of these areas is very small such as, for example, less than 0.3 square inches, there is very little heat transfer by conduction from pan 26 to base 24. The outer portion of spacer 63 rises upwardly from platform 70 to form ridge 72. In combination, the ridges 72 of a plurality of at least three spacers 63 prevent movement of pan 26 in a horizontal direction when supported thereon. In other words, pan 26 is supported in fixed horizontal alignment with base 24.

As stated earlier herein, it may be preferable that layer 42 thermostat in the range from approximately 500° F. to 550° F. in the center of pan 26. For the example configuration given herein, this temperature range provides a cooking temperature in the interior 40 of pizza maker 10 of approximately 375° F. which is considered by many to be ideal for pizza. The central temperature described generally creates an outer bottom temperature near spacers 63 of approximately 440° F. Accordingly, to provide a measure of tolerance, spacers 63 must consist of a material such as, for example, high temperature silicone which is resistant to a higher temperature. Because spacers 63 separate the pan 26 from the rest of base 24, the rest of the base may be made of a material which is not resistent to such high temperatures. For example, the single piece molded base 24 except for spacers 63 may be fabricated from polysulfone which typically will distort at a temperature of 345° F. at 264 PSI.

As stated earlier, legs 52 are relatively long to reduce the heat transfer from pan 26 to base 24. More specifically, it is preferable that legs 52 be longer than 1.5 inches and in application, the legs elevate pan 26 approximately 1.75 inches above floor 61. The long length of legs 52 reduces the radiant heating of the floor 61 of the cavity from layer 42. Furthermore, the long legs provide increased convection cooling of the region 74 under pan 26 by natural convection through the central hole 76 of member 50.

Cover 28 is fabricated of a microwave reflective or conductive material such as, for example, aluminum. The combination of cover 28 and pan 26 provides a pizza maker interior 40 which is not subjected to any significant amount of microwave energy. More specifically, when cover 28 is positioned on base 24, both it and pan 26 are held in fixed alignment with base 24; therefore, the pan and cover are held in fixed alignment with each other. As mentioned earlier, side 36 of the pan rises upwardly for a distance greater than ⅝ of an inch as seen best in FIG. 4. Side 36 is substantially parallel with the side 77 of cover 28 in a vertical direction to form a partial microwave choke. In theory, for optimum sealing, it may be preferable that the vertical parallel distance of the pan and the cover be an odd multiple of a quarter wavelength of the microwave energy. In practice, it has been found that a distance of an inch or greater is more than adequate and a distance of ⅝ of an inch is sufficient. It is remembered that it is not essential that an absolute choke be formed because a small amount of microwave leakage into the interior of the pan does not have a significant effect on performance.

In the center of cover 28 is a hole 80 having a dimension below microwave cutoff for attaching handle 30. Preferably, handle 30 consists of a material such as polysulfone which is transparent to microwave energy so as not to provide arcing to cover 28 nor act as a center conductor for coupling microwave energy through hole 80. Although handle 30 may be attached by a plurality of methods, it may be preferable that the bottom 84 of handle 30 be larger than hole 80 and that a plug 86 be connected to handle 30 by ultrasonic bonding into channel 88 in handle 30. The plug 86 has an outer dimension which initially is slightly larger than channel 88. The plug is inserted into the channel from the underside of cover 28 by well known ultrasonic bonding and pressure application by an anvil.

Figure 6:
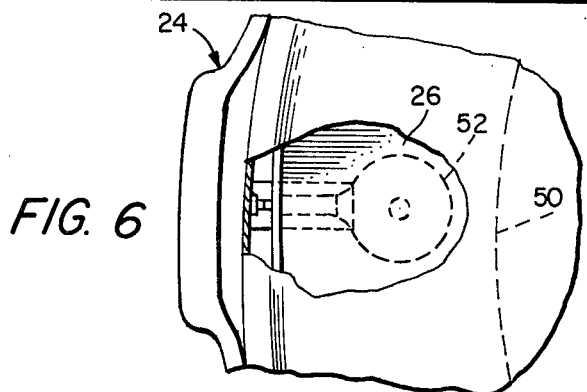
FIG. 6 is a top view of an alternate embodiment of the spacer shown in FIGS. 3, 4, and 5.
Figure 7:
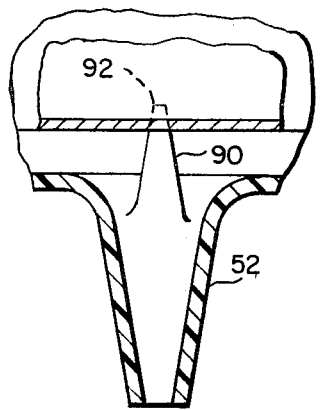
FIG. 7 is a front view of the spacer of FIG. 6.
Figure 8:
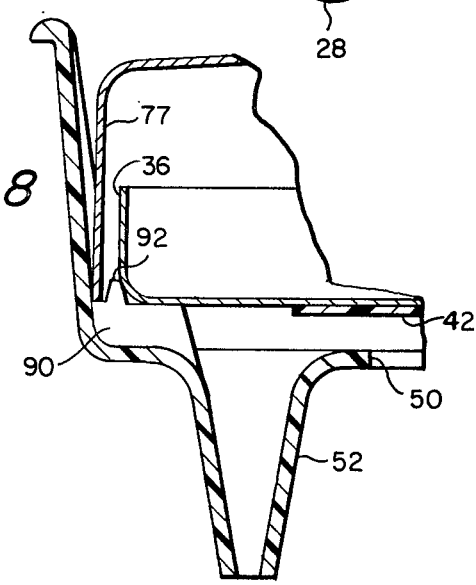
FIG. 8 is a side view of the spacer of FIG. 6.

Referring to FIGS. 6, 7, and 8, top front and side views are respectively shown of an alternate embodiment of the spacers 63 of FIGS. 3, 4, and 5. Spacers 90 provide the same functions as spacers 63. More specifically, spacers 90 rise above member 50 to create a relatively small contact surface for supporting pan 26. Furthermore, the ridges 92 of spacers 90 support pan 26 in a fixed horizontal alignment with base 24. Because cover 28 is also in fixed horizontal alignment with base 24, a partial choke is defined by the parallel surfaces of the pan and the cover. Unlike spacers 62, however, spacers 90 are part of the single piece mold of the base 24. In this alternate embodiment, although base is made by a single mold without the necessity and labor of snapping in other parts such as spacers 63, the entire base 24 must be made of a material that is resistant to the contact temperature of the pan. More specifically, because spacers in this embodiment are subjected to temperatures which may be 440° F. or even higher, polysulfone is not an appropriate material. A microwave transparent material resistant to temperatures above 500° F. can be used. An example of such a material is Ryton but it has been found difficult to mold.

Figure 9:
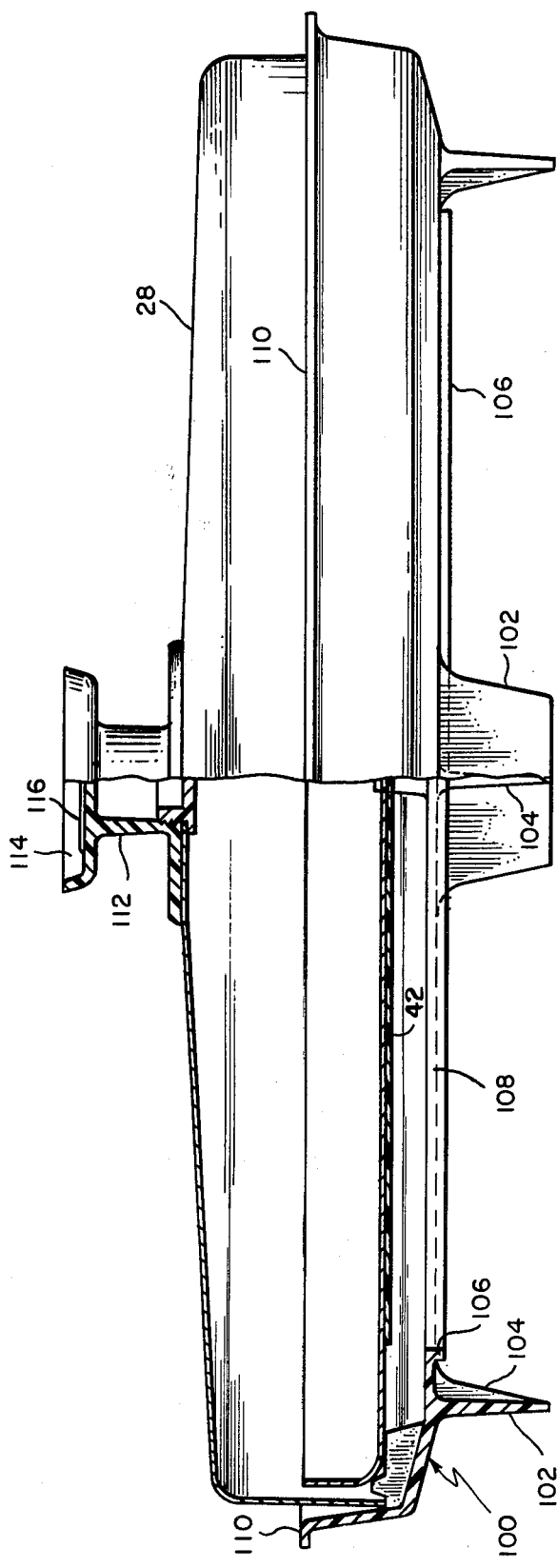
FIG. 9 is a front view partially cut away showing an alternate embodiment of the pizza maker.

Referring to FIG. 9, a partially cutaway view of an alternate embodiment of pizza maker 10 is shown. Instead of having eight circular legs as shown with base 24, base 100 has four elongated legs 102 spaced evenly around the circumference of the base. Each leg 102 may preferably have a width at the bottom of approximately 1.5 inches providing a substantial space between legs for natural convection cooling of the floor underneath pizza maker 10. Legs 102 have support ridges 104 to increase the structural strength of base 100. Furthermore, flange 106 around central aperture 108 provides additional strength. Instead of having the upwardly extending handles 56 as described earlier herein, base 100 has an outwardly extending band 110 at a constant height. Band 110 is spaced from cover 20 so that, for lifting, thumbs may be positioned thereon without contacting the hot cover 28. The structural differences of the base described with reference to FIG. 9 may be desirable because of fabrication tooling considerations. Handle 112 has a recessed top 114 and may have a pad 116 to facilitate sonic welding.

In operation, for use with commercially available frozen pizzas, it has been desirable to position base 24 and pan 26 with pizza therein into the microwave oven for an initial cycle of two minutes. Then, cover 28 is placed over the pan for approximately 10 more minutes of cooking depending on parameters such as the size of the pizza and the output power of the microwave oven. When cooking with the cover, substantially all of the available microwave energy is absorbed by layer 42 without any significance amount being absorbed by pizza which is shielded. The layer may heat up to a temperature in the range from 500° F. to 550° F. creating an interior temperature in the pizza maker of approximately 375° F. Heating a pizza in this described temperature environment which is shielded from microwave energy drives the moisture out of the crust and provides a pizza which is not soggy as with the prior art.

To one skilled in the art, the reading of this disclosure will bring to mind many modifications and alterations without departing from the spirit and scope of the invention. For example, the utensil could be used for many foods other than pizzas. Also, with minor modification, the inventive principle could be adapted to microwave cooking utensils particularly designed for other types of foods. Accordingly, it is intended that the preferred embodiment be only illustrative of the invention and the scope thereof only be limited by the claims.

I claim:

1. A utensil for heating pizza in a microwave oven, comprising:
    a horizontal annular base having a plurality of spaced slots around the peripheral region of said annular base, said base being made of a first microwave transparent material;
    support pedestals inserted into said slots, the top of each of said pedestals having a substantially horizontal inward surface and a raised outer member, said pedestals being made of a second microwave transparent material which is a higher temperature material than said first microwave transparent material;
    a metallic pan having a substantially flat bottom with a raised side, sid pan being removably supported in fixed horizontal alignment by said horizontal inward surfaces of said pedestals;
    a layer comprising ferrite particles bonded to the underside of said bottom and directly facing the floor of said microwave oven for producing heat by absorption of microwave energy, said heat being conducted through said pan to heat pizza therein, said layer being spaced from said pedestals;
    said base having a plurality of legs, the downward ends of said legs being spaced more than an inch from said removably supported pan;
    a metallic cover removably supported by said base, said cover having a peripheral region overlapping said raised side for a distance of greater than 0.25 inches in a direction perpendicular to the edge of said side, said region being spaced and substantially parallel to said side for forming a partial microwave choke to limit the amount of microwave energy in the interior defined by said pan and said cover; and
    the opening of said annular base providing a path for natural convection air to be drawn inwardly from between said legs to replace air heated adjacent to said microwave absorbing layer and convected outwardly between said spaced pedestals thereby limiting the temperature to which said base, support pedestals, and the floor of said microwave oven are subjected.

2. The utensil recited in claim 1 wherein said pan and said cover comprise aluminum.

3. The utensil recited in claim 1 comprising eight pedestals.

4. A utensil for heating pizza in a microwave oven, comprising:
    a horizontal annular base having legs, said base being fabricated from a first microwave transparent material and having eight spaced slots around the peripheral region thereof;
    a support pedestal inserted into each of said slots and extending upwardly, the top of each of said pedestals having a substantially horizontal platform on the inward side and a raised member on the outward side, said pedestals being fabricated from a second microwave transparent material which is a higher temperature material than said first microwave transparent material;
    said base comprising handles extending upwardly from the periphery of said base to a height above said pedestals;
    a metallic pan having a substantially flat bottom defining a surface having a shape substantially equal to said perimeter, said pan being removably supported by said horizontal platforms of said pedestals, said raised members restricting horizontal movement of said pan with respect to said base;
    said pan having a raised side;
    a layer comprising ferrite particles dispersed in high temperature silicone bonded to the underside of said bottom and directly facing the floor of said microwave oven, said layer heating by microwave absorption for conduction through said pan to the interior thereof;
    the bottom ends of said legs being more than one inch from said removably supported pan;
    the opening of said annular base providing a path for natural convection air to be drawn inwardly from between said legs to replace air heated adjacent to said microwave absorbing layer and convected outwardly between said spaced pedestals to limit the temperature to which said base, support pedestals, and the floor of said microwave oven are subjected; and
    a metallic cover removably supported by said base, said cover having a peripheral region overlapping said side for a distance greater than 0.25 inches in a direction perpendicular to the edge of said side, said region being spaced and substantially parallel to said side for forming a partial microwave choke to limit the amount of microwave energy in the interior defined by said pan and said cover.

5. The utensil recited in claim 4 wherein said pan and said cover comprise aluminum.

6. The utensil recited in claim 4 wherein said support pedestals comprise high temperature silicone.

* * * * *